June 28, 1927.  W. F. HENDRY  1,633,583

ELECTRIC BELL

Filed July 15, 1924

INVENTOR
W. F. Hendry
BY
his ATTORNEY

Patented June 28, 1927.

1,633,583

UNITED STATES PATENT OFFICE.

WILLIAM F. HENDRY, OF OSSINING, NEW YORK, ASSIGNOR TO MANHATTAN ELECTRICAL SUPPLY COMPANY, INCORPORATED, OF NEW YORK, N. Y., A CORPORATION OF MASSACHUSETTS.

ELECTRIC BELL.

Application filed July 15, 1924. Serial No. 726,181.

This invention relates to new and useful improvements in the assembling and mounting of electromagnets.

Figure 1:
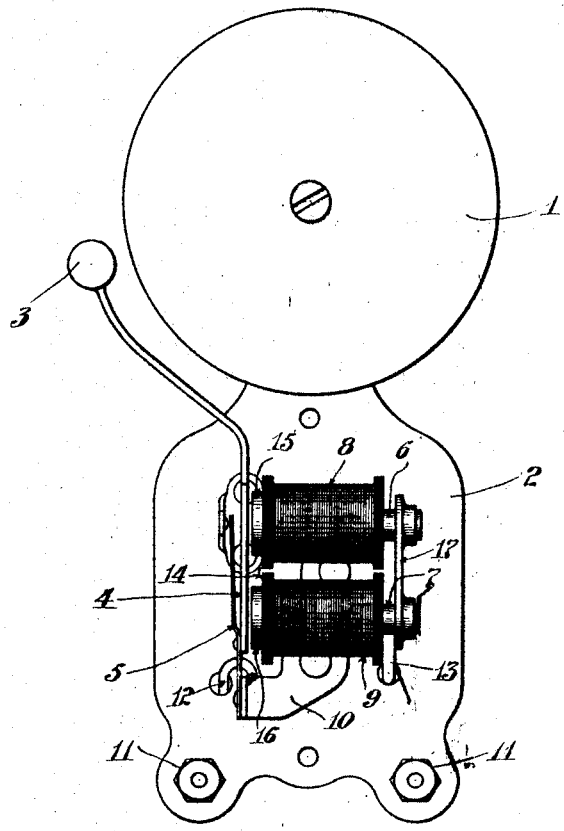
Figures 2, 3:
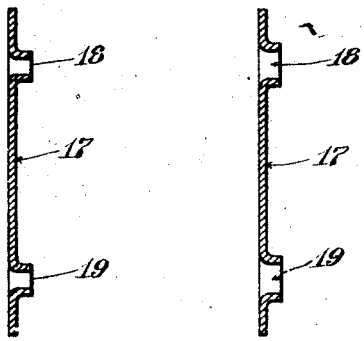

The invention is illustrated in the drawings as embodied in an electric bell structure, Fig. 1 being a front view of a bell, and Figs. 2 and 3 illustrating successive stages of the assembling process of the magnet structure.

The bell consists of the usual gong 1 mounted on a suitable base 2 and adapted to be operated by a hammer 3 provided on the end of an elongated armature 4. The armature is maintained in its normal position by means of a leaf spring 5 mounted on a bracket 10 which carries also the magnet structure proper. The bracket 10 is riveted to the base 2. The magnet structure consists of two soft iron cores 6 and 7 surrounded by suitable coils 8 and 9, one of the terminals of which are connected in the well-known manner to binding posts 11 through conductors 12 and 13. The other ends of the coils are interconnected at 14. 15 and 16 are the usual enlarged pole pieces of the cores. The other ends of the cores 6 and 7 are held in a plate 17 which forms part of the bracket 10, but is bent up at right angles. The plate 17 serves as a mounting for the magnet as well as a means for completing the magnetic circuit.

It has been the practice to mount the magnet structure on plates like 17 by welding or riveting the ends of the cores to the plate and in order to make this possible, it was necessary to turn down the ends of the cores, the recessed ends fitting quite snugly within holes in the plate 17. In order to save the expense of a special riveting or welding operation and to obviate the necessity of turning down the ends of the cores, in accordance with the present invention the cores 6 and 7 are of uniform diameter throughout their lengths. Two holes 18 and 19 are punched in the plates 17. When this punching operation is performed the cross section of the plate 17 will be as illustrated in Fig. 2 with the metal drawn into a rim surrounding the perforations 18 and 19. The perforations are not large enough to admit the ends of cores 6 and 7 and, as the next operation, the ends of the cores are forced into perforations 18 and 19 until they slightly protrude therefrom. The perforations are thus enlarged and the metal around them will now assume the form illustrated in Fig. 3.

It will be seen, therefore, that the attachment of the pole pieces to the plate 17 consists substantially in performing two stages of a drawing operation. The condition of the plate 17 after the first stage of the drawing operation is shown in Fig. 2, and its condition after the second stage is shown in Fig. 3. The cores 6 and 7 are the tools used in the second drawing operation and are left in the work. The resiliency of the plate 17 will be sufficient to insure a solid grip on the cores by friction between the plate and the core ends. The assembling operation can of course be readily controlled to insure proper spacing of the plate 17, and it is not necessary to take special precautions for protecting the coils 8 and 9, as would be the case if the cores were welded to the plate 17.

What I claim is:

1. The method of assembling electromagnets which consists in first punching two holes in a metal plate, the metal around the holes being drawn into rings of smaller diameter than the ends of the magnet cores, then forcing the ends of magnet cores carrying the coils through the perforations, and finally mounting the magnet by means of said plate.

2. In an electric bell, a magnet structure comprising two cores with windings thereon, said cores terminating at one end in pole pieces and being of the same diameter throughout their lengths, and a relatively thin plate provided with two perforations within which the other ends of the cores are held by friction between the ends of the cores and the plate.

In testimony whereof, I have signed my name to this specification this 14th day of July 1924.

WILLIAM F. HENDRY.